UNITED STATES PATENT OFFICE.

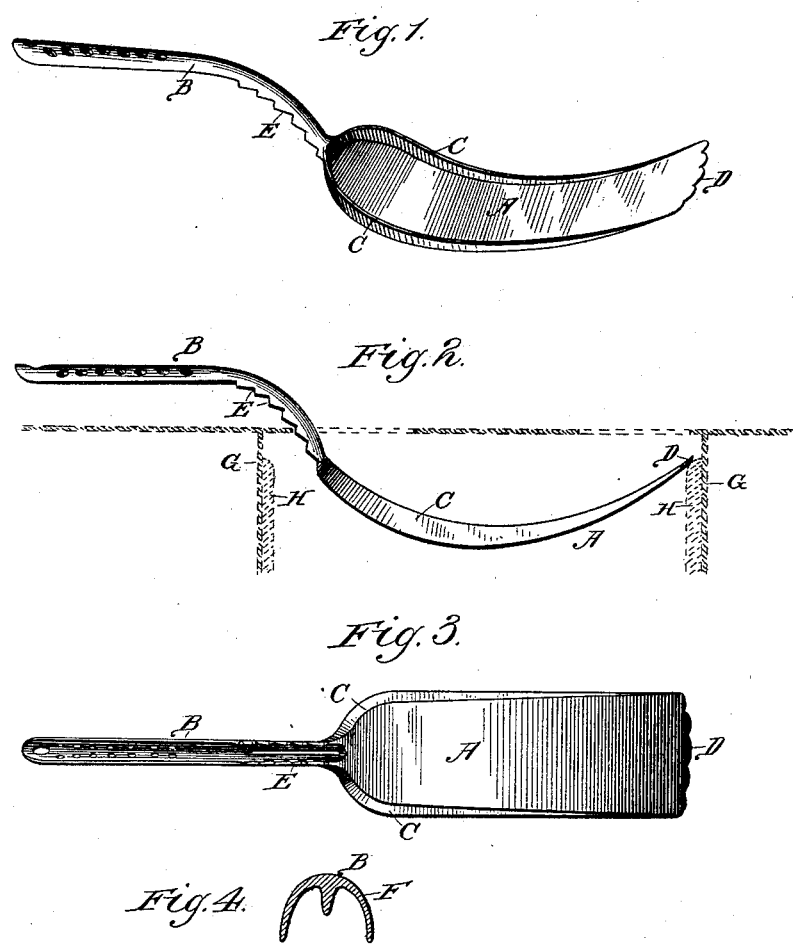

MIRON GRAHAM TOUSLEY, OF ENGLEWOOD, ILLINOIS, ASSIGNOR TO ARMENA PATRICK, OF SAME PLACE.

SHOVEL.

SPECIFICATION forming part of Letters Patent No. 357,970, dated February 15, 1887.

Application filed November 19, 1885. Serial No. 183,302. (No model.)

*To all whom it may concern:*

Be it known that I, MIRON GRAHAM TOUSLEY, a citizen of the United States, residing at Englewood, in the county of Cook and State of Illinois, have invented a new and useful Improvement in Shovels, of which the following is a specification.

My invention is a new kitchen utensil and a new article of manufacture—a shovel for use in dumping cinders without extinguishing fires, so curved, shaped, and adapted as to admit of its being inserted through a kettle-hole into the fire-box of any ordinary cooking stove or range, and for being passed between the burning embers and cinders until its point rests on top of the opposite fire-brick and its handle on the outside of the kettle-hole through which it enters, so, while the embers and fuel are thus suspended, the cinders and rubbish may be dumped.

Other devices have been invented to accomplish this object, but none have been similar in application or construction to this, and none have come into popular use, while the necessity of perpetually burning kitchen fires in winter, to keep water-backs hot and water-pipes from freezing, makes some practical method of dumping débris from burning fires a necessity.

Said invention consists of a peculiarly shaped and constructed shovel, which may be of any desired thickness or metal and cast solid or stamped from sheets or made in parts, as desired, the blade of said shovel being sufficiently narrow to enter the fire-box in front of the water-back, sufficiently long to properly span the length of the fire-box, sufficiently curved lengthwise—from the center upward—to suspend all burning material when its point rests on top of the opposite fire-brick and its handle on the outside of the kettle-hole through which it enters, and furnished with an upturned rim on its rear and sides of any height or taper toward the point desired; and the point of said blade may be rounded or scalloped, the handle of said shovel reversing the curve of the blade at the point of its connection and for any desired proportion of its length, and, being furnished with notches at the lower side of the curve, forming stops to catch on the edge of the kettle-hole and prevent the shovel from slipping back when the blade is inserted in the fire-box. The blade and handle may be perforated in any manner desired to lighten construction.

In the accompanying drawings, in which similar letters of reference indicate like parts, Figure 1 is a perspective view of the shovel, showing its general shape. Fig. 2 is a side or edge view, showing its proportionate curves, and the dotted lines show the relative position of the top of the stove and of the fire-brick when the shovel is inserted. Fig. 3 is a bottom view of the shovel, showing the handle and its attachment to the blade. Fig. 4 is a section of the handle, showing its arched form—the preferred, but not necessary, method of its construction.

In all the lettered views of the drawings, A shows the blade of the shovel that enters the fire-box of the stove.

B shows the handle of the shovel, by which it is lifted and used.

C shows the upturned rim that stiffens the blade and holds the embers from falling.

D shows the scallops at the point of the blade that facilitate the entrance of the point between the burning embers and cinders.

E shows the notches of the handle forming the stops *e*, that lock to the edge of the kettle-hole and prevent the shovel from slipping back when inserted.

F shows the arch of the handle—the preferred shape—to give it strength and lightness.

G indicates, by dotted lines, the upper portion of an ordinary stove, showing the relative position of the shovel when supporting the burning embers.

H shows the fire-brick and the manner of supporting the end of the shovel thereon.

The method of applying and operating my invention is as follows: After removing one of the stove-lids from over the fire-box elevate the handle of the shovel and plunge its point down below all the burning material; then continue to lower the handle and push the blade until the blade has passed between the burning embers and cinders and until its point rests on the top of the opposite fire-brick and its handle locks on the outer edge of the kettle-hole through which it enters; then dump the cinders and replace the grate; then lift the handle of the shovel and withdraw its blade, leaving the burning mass to rest cleanly on the grate of the stove, and replace the cover.

I do not claim, broadly, a shovel curved longitudinally and terminating abruptly at its rear and having the handle applied to such end near its top.

Having thus described my invention, what I claim, and desire to secure by Letters Patent, is—

1. A shovel for the herein-described purpose, composed of a blade longitudinally curved in an upward direction and the handle having stops formed on its rear or lower side, as and for the purpose specified.

2. A shovel having its front edge serrated or scalloped for facilitating the entrance of the point between the embers, substantially as and for the purpose described.

3. The herein-described shovel, for the purpose specified, comprising the blade having its front edge scalloped, and upwardly curved from front to rear, and the handle symmetrically curved for a portion of its length and notched on its rear, forming stops, substantially as and for the purpose described.

MIRON GRAHAM TOUSLEY.

Witnesses:
WILBUR H. TOUSLEY,
S. THORNTON.